United States Patent
Sluijs et al.

(10) Patent No.: US 10,370,491 B2
(45) Date of Patent: Aug. 6, 2019

(54) PREPARATION OF HIGHLY HEAT-RESISTANT (CO)POLYCARBONATES BY THE TRANSESTERIFICATION METHOD

(71) Applicant: Covestro Deutschland AG, Leverkusen (DE)

(72) Inventors: Ivan Sluijs, Boechout (BE); Jan Heijl, Lokeren (BE); Erik Sluyts, Brasschaat (BE); Frank Bruynseels, Sint-Gillis Waas (BE)

(73) Assignee: Covestro Deutschland AG, Leverkusen (DE)

( * ) Notice: Subject to any disclaimer, the term of this patent is extended or adjusted under 35 U.S.C. 154(b) by 6 days.

(21) Appl. No.: 15/544,767

(22) PCT Filed: Jan. 20, 2016

(86) PCT No.: PCT/EP2016/051071
§ 371 (c)(1),
(2) Date: Jul. 19, 2017

(87) PCT Pub. No.: WO2016/116480
PCT Pub. Date: Jul. 28, 2016

(65) Prior Publication Data
US 2017/0369642 A1    Dec. 28, 2017

(30) Foreign Application Priority Data
Jan. 20, 2015 (EP) .................................... 15151812

(51) Int. Cl.
*C08G 64/14* (2006.01)
*C08G 64/30* (2006.01)

(52) U.S. Cl.
CPC ........... *C08G 64/14* (2013.01); *C08G 64/307* (2013.01)

(58) Field of Classification Search
CPC .............................. C08G 64/14; C08G 64/307
USPC .................................................. 528/198, 204
See application file for complete search history.

(56) References Cited

U.S. PATENT DOCUMENTS

| 5,086,159 | A | 2/1992 | Fritsch et al. |
| 6,703,473 | B2 * | 3/2004 | Hucks .................. C08G 64/307 422/131 |
| 7,968,671 | B2 * | 6/2011 | Heuer .................... C08G 64/14 428/411.1 |
| 2005/0261460 | A1 | 11/2005 | Cella et al. |

FOREIGN PATENT DOCUMENTS

EP    0414083 A2    2/1991

OTHER PUBLICATIONS

International Search Report and Written Opinion for International Application No. PCT/EP2016/051071, European Patent Office, dated Mar. 18, 2016.
Pickett, "Influence of photo-Fries reaction products on the photodegradation of bisphenol-A polycarbonate", Polymer Degradation and Stability, vol. 96, (2011), pp. 2253-2265.

* cited by examiner

*Primary Examiner* — Fred M Teskin
(74) *Attorney, Agent, or Firm* — K&L Gates LLP

(57) ABSTRACT

The present invention relates to a melt transesterification process for the production of (co)polycarbonates from diaryl carbonates and cycloalkylidene diphenols, which process comprises the addition of a monohydroxyaryl compound in an amount of 5.0 to 20.0 wt.-%, based on the total mass of the reaction mixture. The invention further relates to a (co)polycarbonate obtained by the process.

15 Claims, No Drawings

PREPARATION OF HIGHLY HEAT-RESISTANT (CO)POLYCARBONATES BY THE TRANSESTERIFICATION METHOD

CROSS-REFERENCE TO RELATED APPLICATIONS

This application is a U.S. national stage application, filed under 35 U.S.C. § 371, of PCT/EP2016/051071, which was filed on Jan. 20, 2016, and which claims priority to European Patent Application No. 15151812.3, which was filed on Jan. 20, 2015, the contents of each of which are incorporated by reference into this specification.

FIELD

The present invention relates to a melt transesterification process for the production of (co)polycarbonates from diaryl carbonates and cycloalkylidene diphenols, which process comprises the addition of a monohydroxyaryl compound in an amount of 5.0 to 20.0 wt.-%, based on the total mass of the reaction mixture. The invention further relates to a (co)polycarbonate obtained by the process.

Polycarbonates can be prepared by various processes. Firstly, the polycarbonate prepared by the interfacial polymerization process (IPC) has acquired industrial importance. The second process used in industry is the melt polycarbonate (MPC) process. Polycarbonate which is produced in the melt from organic carbonates, e.g. diaryl carbonates, and from bisphenols without use of additional solvents by what is known as the melt transesterification process is achieving increasing economic importance and is therefore a suitable material for many application sectors.

BACKGROUND

The preparation of aromatic polycarbonates by the melt transesterification process is known and is described, for example, in "Schnell", Chemistry and Physics of Polycarbonats, Polymer Reviews, Vol. 9, Interscience Publishers, New York, London, Sydney 1964, in D. C. Prevorsek, B. T. Debona and Y. Kersten, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), in D. Freitag, U. Grigo, P. R. Müller, N. Nouvertne, BAYER AG, "Polycarbonates" in Encyclopedia of Polymere Science and Engineering, Vol. 11, Second Edition, 1988, pages 648-718 and finally in Dr. U. Grigo, K. Kircher and P. R. Müller "Polycarbonate" in Becker/Braun, Kunststoff-Handbuch [Plastics Handbook], Volume 3/1, Polycarbonate, Polyacetale, Polyester, Celluloseester [Polycarbonates, polyacetals, polyesters, cellulose esters], Carl Hanser Verlag, Munich, Vienna 1992, pages 117-299.

Said process was developed mainly for the transesterification of diphenyl carbonate with bisphenol-A. The transesterification of ester-substituted diaryl carbonates, such as bis-methyl salicyl carbonate, with bisphenol A is also known, e.g. from US 2005/0261460 A1.

Due to their high heat resistance, polycarbonates are used, inter alia, in fields in which a relatively high level of thermal stress is likely to occur. Specific (co)polycarbonates based on cycloalkylidendiphenols, an example being a copolycarbonate based on bisphenol A and bisphenol TMC (1,1-bis (4-hydroxyphenyl)-3,3,5-trimethylcyclohexane) are known to be particularly heat resistant. The production and use of such polycarbonates based on cycloalkylidenediphenols is described, for example, in DE 3 903 103 A1, EP 414 083 A2 and EP 359 953 A1.

During the production of specialty polycarbonates with high temperature resistance by means of the known transesterification process, the high temperature resistance is a drawback. Because of this difficulty, highly heat resistant polycarbonates are normally made by means of the interfacial polycondensation process with phosgene.

For example, highly heat resistant polycarbonates containing structural units derived from 1,1-Bis(4-hydroxyphenyl)-3,3,5-trimethyl-cyclohexane (bisphenol TMC) are not commercially prepared by the melt transesterification process. This is because due to the high temperatures required to form a melt, a large portion of diphenyl carbonate is lost into the vacuum system in the early stages of the reaction process and thus hampers phenol recovery. In addition, the early loss of diphenyl carbonate adversely affects the further polycondensation process, because it results in a highly viscous reaction mixture, which causes processing and reactivity issues leading to a high residual monomer content and low molecular weight of the final product as well as bad process reliability.

For this reason, complex work-around processes have been developed in the past for the preparation of highly heat resistant polycarbonates by means of the melt transesterification process (cf. DE4315035A1), and up to now, the commercial production of such polycarbonates is restricted to the interfacial technology.

SUMMARY

It is therefore an object of the present invention to provide a process for the production of highly heat resistant polycarbonates by means of the melt transesterification process which allows the use of standard melt transesterification equipment and standard processing conditions.

DETAILED DESCRIPTION

Surprisingly, it has been found that the addition of monohydroxyaryl compound which corresponds to the monohydroxyaryl compound generated by the transesterification process to the monomer mixture reduces the melting point of the bulk monomer mixture and slows down the polycondensation reaction in the early stages. Further, said addition does not induce any side reactions, as the monohydroxyaryl compound is present in the reaction mixture as condensation product anyway.

This allows for standard conditions to be used in the standard polycondensation equipment and for the monohydroxyaryl compound recovery system to remain functional.

The present invention provides for a process for preparing (co)polycarbonates by the melt transesterification method, the process comprising reacting at least one diaryl carbonate with a dihydroxyaryl compound of formula (1),

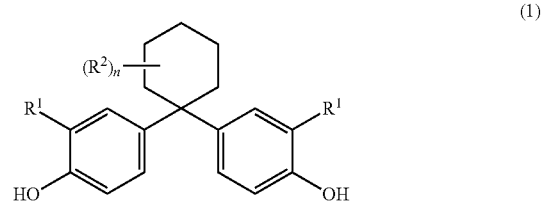

in which
R¹ is H or $C_1$-$C_4$-alkyl, preferably H,
R² is $C_1$-$C_4$-Alkyl, preferably methyl, and
n is 0, 1, 2 or 3, preferably 3,
and optionally one or more further dihydroxyaryl compounds, wherein the process comprises the addition of an monohydroxyaryl compound in an amount of 5.0 to 20.0 wt.-%, based on the total mass of the reaction mixture.

The process according to the invention is performed by the known melt transesterification method. According to this process, aromatic dihydroxy compounds are subjected to transesterification with diaryl carbonates with the aid of suitable catalysts and optionally further additives in the melt.

The process is effected in a plurality of stages, preferably in reactors which are connected in series and in which the molecular weight and hence the viscosity of the (co)polycarbonate is increased stepwise.

The temperatures may be in the range from 150 to 400° C. in each step, the residence time may be 15 minutes to 5 hours in each step and the pressures may be 1000 to 0.01 mbar in each step.

Preferably, the process according to the invention is performed step-wise, wherein the temperature is increased from one step to the other and the pressure is decreased from one step to the next. The temperature in the last step is preferably within the range of from 180° C. to 400° C. and the pressure in the last step is preferably within the range of 0.001 mbar to 50 mbar.

For carrying out the process according to the invention, for example, it is possible to use a plant design as shown in WO-A 02/077 067. Accordingly, the process may be carried out by transesterification of the diaryl carbonate with the dihydroxyaryl compound of formula (1) and optionally further dihydroxyaryl compounds in the presence of quaternary onium compounds, an oligocarbonate being prepared in a plurality of evaporator stages at temperatures increasing stepwise and pressures decreasing stepwise, which oligocarbonate is subjected to condensation in one or two basket reactors connected in series at further increasing temperatures and decreasing pressures to give the (co)polycarbonate.

Preferably, the final product of the process according to the invention is a homopolycarbonate or copolycarbonate with a weight average molecular weight (Mw) within the range of from 15,000 to 150,000 g/mol, more preferably 20.000 to 50.000 g/mol.

Definitions

In the present invention, the following definitions apply to generically defined groups:

"$C_1$-$C_4$ alkyl" is a linear or branched alkyl radical having 1 to 4 carbon atoms. $C_1$-$C_4$-alkyl represents for example methyl, ethyl, n-propyl, isopropyl, n-butyl, sec-butyl or tert-butyl. "$C_1$-$C_6$ alkyl" is a linear or branched alkyl radical having 1 to 6 carbon atoms. Examples are the above-mentioned $C_1$-$C_4$-alkyl radicals and additionally n-pentyl, 1-methylbutyl, 2-methylbutyl, 3-methylbutyl, neopentyl, 1-ethylpropyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and 1-ethyl-2-methylpropyl. "$C_1$-$C_{34}$ alkyl" is a linear or branched alkyl radical having 1 to 34 carbon atoms. Examples are the above-mentioned $C_1$-$C_6$-alkyl radicals and additionally, for example, n-heptyl and n-octyl, pinacolyl, adamantyl, the isomeric menthyls, n-nonyl, n-decyl, n-dodecyl, n-tridecyl, n-tetradecyl, n-hexadecyl, n-octadecyl and stearyl. The same applies to the corresponding alkyl radical, for example, in aralkyl (arylalkyl) or alkylaryl, alkylphenyl or alkylcarbonyl radicals. Alkylene radicals in the corresponding hydroxyalkyl or aralkyl or alkylaryl radicals are, for example, alkylene radicals corresponding to the above alkyl radicals.

"Aryl" is a carbocyclic aromatic radical having 6 to 34 skeletal carbon atoms. The same applies to the aromatic moiety of an arylalkyl radical, also called aralkyl radical, and to aryl constituents of more complex groups, for example arylcarbonyl radicals.

Examples of "$C_6$-$C_{34}$-aryl" are phenyl, o-, p-, m-tolyl, naphthyl, phenanthrenyl, anthracenyl or fluorenyl.

"Arylalkyl" or "aralkyl" is in each case independently a straight-chain, cyclic, branched or unbranched alkyl radical as defined above, which may be singly, multiply or fully substituted by aryl radicals as defined above.

The above enumerations should be understood by way of example and not as a limitation.

In the context of the present invention, ppm and ppb—unless stated otherwise—are understood to mean parts by weight.

Diaryl Carbonate

The diaryl carbonates suitable for the reaction with the dihydroxyaryl compounds of formula (1) are those of the general formula (2)

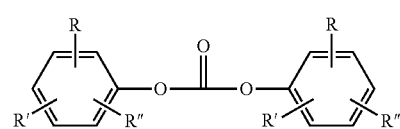

in which
R represents hydrogen, linear or branched $C_1$-$C_{34}$-alkyl, $C_7$-$C_{34}$-alkylaryl, $C_6$-$C_{34}$-aryl or —COO—R''', R''' representing hydrogen, linear or branched $C_1$-$C_{34}$-alkyl, $C_7$-$C_{34}$-alkylaryl or $C_6$-$C_{34}$-aryl, and
R' and R", independently of one another, are identical or different and represent hydrogen, linear or branched $C_1$-$C_{34}$-alkyl, $C_7$-$C_{34}$-alkylaryl or $C_6$-$C_{34}$-aryl.
Preferably, R, R' and R", independently of one another, are identical or different and represent hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates, di(methylphenyl)carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di-[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, methyl salicyl phenyl carbonate, di(methylsalicyl) carbonate, ethylsalicyl phenyl carbonate, di(ethylsalicyl) carbonate, n-propylsalicyl phenyl carbonate, di(n-propylsalicyl) carbonate, isopropylsalicyl phenyl carbonate, di(isopropylsalicyl) carbonate, n-butylsalicyl phenyl carbonate, di(n-butylsalicyl) carbonate, isobutylsalicyl phenyl carbonate, di(isobutylsalicyl) carbonate, tert-butylsalicyl phenyl carbonate, di(tert-butylsalicyl) carbonate, di(phenylsalicyl) carbonate and di(benzylsalicyl) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl)phenyl] carbonate and di(methylsalicyl) carbonate.

Diphenyl carbonate is very particularly preferred.

It is possible to use both one diaryl carbonate and different diaryl carbonates.

Based on the dihydroxyaryl compound(s), in general 1.02 to 1.30 mol of the diaryl carbonate(s), preferably 1.04 to 1.25 mol, particularly preferably 1.045 to 1.22 mol, very particularly preferably 1.05 to 1.20 mol, per mole of dihydroxyaryl compound are used. It is also possible to use mixtures of the abovementioned diaryl carbonates, the molar amounts per mole of dihydroxyaryl compound which are mentioned above then being based on the total amount of the mixture of the diaryl carbonates.

Dihydroxyaryl Compound

In the process according to the invention, the diaryl carbonate is reacted with at least one dihydroxyaryl compound of formula (1). Especially preferred are dihydroxyaryl compounds of formula (1), wherein $R^1$ is H, $R^2$ is methyl and n is 3 (Bis(4-hydroxyphenyl)-3,3,5-trimethylcyclohexane, bisphenol TMC).

The reaction product of the process according to the invention is a (co)polycarbonate; i.e. it may be a homopolycarbonate or copolycarbonate. Copolycarbonates may be obtained by using two or more dihydroxyaryl compounds of formula (1) or by using a combination of a dihydroxyaryl compound of formula (1) and one or more further dihydroxyaryl compounds.

Preferably, the molar ratio of the dihydroxyaryl compound of formula (1) and the further dihydroxyaryl compound is within the range of from 1:99 to 99:1, more preferably 20:80 to 99:1, Further dihydroxyaryl compounds suitable for the process according to the invention are those of the general formula (3)

HO—Z—OH (3)

in which Z is an aromatic radical which has 6 to 34 C atoms and may contain one or more optionally substituted aromatic nuclei and aliphatic or cycloaliphatic radicals or alkylaryls or heteroatoms as bridge members.

Examples of suitable further dihydroxyaryl compounds are: dihydroxybenzenes, dihydroxy-biphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)-diisopropylbenzenes and the compounds thereof which are alkylated on the nucleus or halogenated on the nucleus.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, page 28 et seq.; page 102 et seq. and in D. G. Legrand, J. T. Bendier, Handbook of Polycarbonate Science and Technology, Marcel Dekker New York 2000, page 72 et seq.

Preferred further dihydroxyaryl compounds are, for example, resorcinol, 4,4'-dihydroxybiphenyl, bis(4-hydroxyphenyl)methane, bis(3,5-dimethyl-4-hydroxyphenyl) methane, bis(4-hydroxyphenyl)-diphenyl methane, 1,1-bis (4-hydroxyphenyl)-1-phenyl ethane, 1,1-bis(4-hydroxyphenyl)-1-(1-naphthyl)ethane, 1,1-bis(4-hydroxyphenyl)-1-(2-naphthyl)ethane, 2,2-bis(4-hydroxyphenyl)-propane, 2,2-bis(3-methyl-4-hydroxyphenyl)propane, 2,2-bis(3,5-dimethyl-4-hydroxyphenyl)-propane, 2,2-bis(4-hydroxy phenyl)-1-phenylpropane, 2,2-bis(4-hydroxyphenyl)hexafluoropropane, 2,4-bis(4-hydroxyphenyl)-2-methylbutane, 2,4-bis(3,5-dimethyl-4-hydroxyphenyl)-2-methylbutane, 1,3-bis [2-(4-hydroxyphenyl)-2-propyl]benzene, 1,1-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis (4-hydroxyphenyl) sulphide, bis(4-hydroxyphenyl) sulphone, bis(3,5-dimethyl-4-hydroxyphenyl) sulphone and 2,2',3,3'-tetrahydro-3,3,3',3'-tetramethyl-1,1'-spirobi[1H-indene]-5,5'-diol.

Particularly preferred dihydroxyaryl compounds are resorcinol, 4,4'-dihydroxybiphenyl, bis(4-hydroxyphenyl) diphenylmethane, 1,1-bis(4-hydroxyphenyl)-1-phenylethane, bis(4-hydroxy-phenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl) propane, 1,1'-bis(4-hydroxyphenyl)-3-diisopropylbenzene and 1,1'-bis(4-hydroxyphenyl)-4-diisopropylbenzene.

A particularly preferred further dihydroxyaryl compound is 2,2-bis(4-hydroxyphenyl)propane (bisphenol A).

Monohydroxyaryl Compound

The monohydroxyaryl compounds suitable for use in the process according to the invention are those of general formula (4)

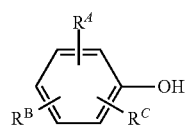

(4)

in which $R^A$ represents hydrogen, linear or branched $C_1$-$C_{34}$-alkyl, $C_7$-$C_{34}$-alkylaryl, $C_6$-$C_{34}$-aryl or —COO—$R^D$, $R^D$ representing hydrogen, linear or branched $C_1$-$C_{34}$-alkyl, $C_7$-$C_{34}$-alkylaryl or $C_6$-$C_{34}$-aryl, and $R^B$ and $R^C$, independently of one another, are identical or different and represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, phenol, 1-, 2- or 3-methylphenol, 2,4-dimethylphenol 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preferably, the monohydroxyaryl compound corresponds to the monohydroxyaryl compound, which is liberated by the reaction of the diaryl carbonate with the dihydroxyaryl compound.

An especially preferred monohydroxyaryl compound is phenol.

In a preferred embodiment, the monohydroxyaryl compound is phenol and the diaryl carbonate is diphenyl carbonate.

The monohydroxyaryl compound may be added before or at the beginning of the reaction. In this regard, "at the beginning of the reaction" shall mean that monohydroxyaryl compound is added before more than 30 wt.-%, preferably more than 20 wt.-%, even more preferably more than 10 wt.-% of the diaryl carbonate have been reacted.

Preferably, the diaryl carbonate, the dihydroxyaryl compound of formula (1), the one or more further dihydroxyaryl compounds, if present, and the monohydroxyl compound are combined before the catalyst is added and/or before a melt is formed and/or before the pressure is reduced below 250 mbar.

The diaryl carbonate, the dihydroxyaryl compound of formula (1) and the one or more further dihydroxyaryl compounds, if present, may be combined before the beginning of the reaction or the monohydroxyaryl compound may be added to the reaction mixture already containing the diaryl carbonate, the dihydroxyaryl compound of formula (1) and the one or more further dihydroxyaryl compounds, if present.

The amount of monohydroxyaryl compound used in the present invention is 5.0 to 20.0 wt.-%, preferably 5.0 to 17.5 wt. %, more preferably 7.0 to 15 wt.-%, based on the total mass of the reaction mixture.

The monohydroxyaryl compound may be recovered from the product mixture, e.g. by using the method and recovery system described in EP 1 221 454 A1. The recovered monohydroxyaryl compound may be re-used in the process according to the invention. Alternatively or additionally, it may be used as starting material for the production of diaryl carbonate and/or bisphenols.

Catalyst

Catalysts suitable for the preparation of (co)polycarbonates according to the invention are the basic catalysts known in the literature, such as, for example, alkali metal and alkaline earth metal hydroxides and oxides and/or onium salts, such as, for example, ammonium or phosphonium salts. Preferably onium salts, particularly preferably phosphonium salts, are used in the synthesis. Such phosphonium salts are, for example those of the general formula (5)

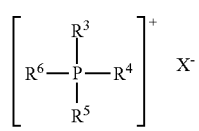

(5)

in which $R^{3-6}$ represent identical or different optionally substituted $C_1$-$C_{10}$-alkyl-, $C_6$-$C_{14}$-aryl-, $C_7$-$C_{15}$-arylalkyl or $C_5$-$C_6$-cycloalkyl radicals, preferably methyl or $C_6$-$C_{14}$-aryl, particularly preferably methyl or phenyl, and $X^-$ represents an anion selected from the group consisting of hydroxide, sulphate, hydrogen sulphate, bicarbonate, carbonate, halide, preferably chloride, and alkylate or arylate of the formula —$OR^{11}$, in which $R^{11}$ represents an optionally substituted $C_6$-$C_{14}$-aryl-, $C_7$-$C_{15}$-arylalkyl or $C_5$-$C_6$-cycloalkylrest, $C_1$-$C_{20}$-alkyl, preferably phenyl.

Particularly preferred catalysts are tetraphenylphosphonium chloride, tetraphenylphosphonium hydroxide and tetraphenylphosphonium phenolate, very particularly preferably tetraphenylphosphonium phenolate.

The catalysts are preferably used in amounts of $10^{-8}$ to $10^{-3}$ mol, particularly preferably in amounts of $10^{-7}$ to $10^{-4}$ mol, based on one mole of dihydroxyaryl compound.

It is optionally also possible to use cocatalysts in order to increase the rate of the polycondensation.

Such cocatalysts may be, for example, salts of alkali metals and alkaline earth metals, such as hydroxides, alkoxides and aryl oxides of lithium, sodium and potassium, preferably hydroxide, alkoxide or aryl oxide salts of sodium. Sodium hydroxide and sodium phenolate are most preferred. The amounts of the cocatalyst may be, for example, in the range from 1 to 200 µg/kg, preferably 5 to 150 µg/kg and most preferably 10 to 125 µg/kg, based in each case on the mass of the dihydroxydiaryl compound used, in each case calculated as sodium.

It is additionally possible to further add a branching agent, such as, for example, compounds which contain three functional phenolic OH groups, to the reaction mixture. The suitable branching agents include phloroglucinol, 3,3-bis(3-methyl-4-hydroxyphenyl)-2-oxo-2,3-dihydroindole, 4,6-dimethyl-2,4,6-tris(4-hydroxyphenyl)hept-2-ene, 4,6-dimethyl-2,4,6-tris(4-hydroxyphenyl)heptane, 1,3,5-tris(4-hydroxyphenyl)benzene, 1,1,1-tris(4-hydroxyphenyl)ethane, tris(4-hydroxyphenyl)-phenylmethane, 2,2-bis[4,4-bis(4-hydroxyphenyl)cyclohexyl]propane, 2,4-bis(4-hydroxyphenyl-isopropyl)phenol, 2,6-bis(2-hydroxy-5'-methylbenzyl)-4-methylphenol, 2-(4-hydroxyphenyl)-2-(2,4-dihydroxyphenyl)propane, hexakis(4-(4-hydroxyphenylisopropyl)phenyl) orthoterephthalate, tetrakis(4-hydroxyphenyl)methane, tetrakis(4-(4-hydroxyphenylisopropyl)phenoxy)methane, 1,4-bis((4',4''-dihydroxytriphenyl)methyl)benzene and isatinbiscresol, pentaerythritol, 2,4-dihydroxy-benzoic acid, trimesic acid, cyanuric acid.

The invention further relates to a (co)polycarbonate obtained by the process according to the invention.

EXAMPLES

In the following examples, (co)polycarbonates were prepared by transesterification of diphenyl carbonate with bisphenol TMC and optionally bisphenol A, optionally in presence of phenol. The amounts of bisphenol A, bisphenol TMC and phenol were varied as follows:

TABLE 1

Overview over the amounts of BPA, BPTMC and phenol used in the examples

| Examples | Mol % bisphenol A, based on total amount of bisphenols | Mol % bisphenol TMC, based on total amount of bisphenols | Wt. % phenol added, based on reaction mixture[1] |
|---|---|---|---|
| 1 (comparative) | 80 | 20 | 0 |
| 2 (comparative) | 70 | 30 | 0 |
| 3 (comparative) | 0 | 100 | 0 |
| 4 (inventive) | 80 | 20 | 10.8 |
| 5 (inventive) | 70 | 30 | 10.7 |
| 6 (inventive) | 0 | 100 | 9.64 |
| 7 (inventive) | 80 | 20 | 19.6 |
| 8 (inventive) | 70 | 30 | 19.3 |
| 9 (inventive) | 0 | 100 | 17.6 |

[1] A small amount of phenol is always present due to the addition of the catalyst in a phenol-containing solution. This amount is the same for all examples (inventive/comparative) and is not shown.

Comparative Example 1

78.72 g of diphenyl carbonate, 63.93 g of bisphenol-A (BPA) and 21.73 g of bisphenol-TMC were molten in an alkali-free glass flask together with 121 µl tetraphenylphosphonium phenolate (TPPP) solution (5 wt.-% TPPP, 5 wt.-% demineralized water and 90 wt.-% phenol), and subjected to a batch transesterification under mechanical stirring. The temperature was increased and the vacuum was improved stepwise as follows:

| | |
|---|---|
| 1. step (1 hour): | 205° C., atmospheric pressure |
| 2. step (20 minutes): | 230° C., 200 mbar absolute pressure |
| 3. step (20 minutes): | 245° C., 100 mbar absolute pressure |
| 4. step (20 minutes): | 275° C., 50 mbar absolute pressure |
| 5. step (20 minutes): | 285° C., 25 mbar absolute pressure |
| 6. step (25 minutes): | 315° C. at 4 mbar absolute pressure |
| 7. step (20 minutes): | 315° C. at 4 mbar absolute pressure |
| 8. step (1 hour): | 330° C. at 0.35 mbar absolute pressure |

The final product is a hazy polymer, with a number average molecular weight (Mn) of 13'950 g/mol and a weight average molecular weight (Mw) of 34'230 g/mol, in each case measured on a Waters GPC system, using a 31'000 g/mol Mw BPA-homopolycarbonate standard in methylene chloride eluent.

The glass transition temperature of the final product is 162.26° C. (onset temperature on second heating at 10° C./min measured on a Perkin Elmer differential scanning calorimeter (DSC)).

The product has 500 ppm terminal phenolic OH groups (measured with IR spectroscopy, calibrated with a BPA-homopolycarbonate standard having 180 ppm terminal phenolic OH groups and measured with a titration method)

Comparative Example 2

78.80 g of diphenyl carbonate, 55.90 g of bisphenol-A and 32.60 g of bisphenol-TMC were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a hazy polymer, with a Mn of 11'680 g/mol and a Mw of 28'540 g/mol, measured on a Waters GPC system, using a 31'000 g/mol Mw BPA-homopolycarbonate standard in methylene chloride eluent.

The glass transition temperature of the final product is 172.92° C. (onset temperature on second heating at 10° C./min measured on a Perkin Elmer DSC).

The product has 500 ppm terminal phenolic OH groups (measured with IR spectroscopy, calibrated with a standard with 180 ppm terminal phenolic OH groups and measured with a titration method).

Comparative Example 3

78.80 g of diphenyl carbonate and 108.67 g of bisphenol-TMC were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a very hard, hazy polymer, with a Mn of 8'240 g/mol and a Mw of 18'820 g/mol, measured on a Waters GPC system, using a 31'000 g/mol Mw BPA-homopolycarbonate standard in methylene chloride eluent.

The glass transition temperature of the final product was not measurable, only an irregular baseline is found in the DSC (at 10° C./min measured on a Perkin Elmer DSC).

The product has 550 ppm terminal phenolic OH groups (measured with IR spectroscopy, calibrated with a standard with 180 ppm of terminal phenolic OH groups and measured with a titration method).

Inventive Example 4

78.72 g of diphenyl carbonate, 63.93 g of bisphenol-A, 21.73 g of bisphenol-TMC and 20 g of phenol were molten in an alkali-free glass flask together with 121 µl tetraphenylphosphonium phenolate solution (5 wt % TPPP, 5 wt % demineralized water and 90 wt % phenol), and subjected to a batch transesterification under mechanical stirring. The temperature and vacuum and stirring conditions were varied according to the method described in example 1.

The final product is a clear polymer, with a Mn of 12'960 and a Mw of 30'870 g/mol, measured on a Waters GPC system, using a 31'000 g/mol Mw BPA-homopolycarbonate standard in methylene chloride eluent.

The glass transition temperature of the final product is 165.59° C. (onset temperature on second heating at 10° C./min measured on a Perkin Elmer DSC).

The product had 500 ppm terminal phenolic OH groups (measured with IR spectroscopy, calibrated with a standard with 180 ppm of terminal phenolic OH groups and measured with a titration method).

Inventive Example 5

78.80 g of diphenyl carbonate, 55.99 g of bisphenol-A, 32.62 g of bisphenol-TMC and 20 g of phenol were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a clear polymer, with a Mn of 12'390 g/mol and a Mw of 29'730 g/mol, measured on a Waters GPC system, using a 31'000 g/mol Mw BPA-homopolycarbonate standard in methylene chloride eluent.

The glass transition temperature of the final product is 172.21° C. (onset temperature on second heating at 10° C./min measured on a Perkin Elmer DSC).

The product has 510 ppm terminal phenolic OH groups (measured with IR spectroscopy, calibrated with a standard with 180 ppm of terminal phenolic OH groups and measured with a titration method).

Inventive Example 6

78.80 g of diphenyl carbonate, 108.67 g of bisphenol-TMC and 20 g of phenol were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a clear polymer, with a Mn of 10'680 g/mol and a Mw of 28'005 g/mol, measured on a Waters GPC system, using a 31'000 g/mol Mw BPA-homopolycarbonate standard in methylene chloride eluent.

The glass transition temperature is 222.5° C. (onset temperature on second heating at 10° C./min measured on a Perkin Elmer DSC).

The product has 540 ppm terminal phenolic OH groups (measured with IR spectroscopy, calibrated with a standard with 180 ppm of terminal phenolic OH groups and measured with a titration method).

Inventive Example 7

78.80 g of diphenyl carbonate, 63.93 g of bisphenol-A, 21.73 g of bisphenol-TMC and 40 g of phenol were molten in an alkali-free glass flask together with 121 µl tetraphenylphosphonium phenolate solution (5 wt % TPPP, 5 wt % demineralized water and 90 wt % phenol), and subjected to a batch transesterification under mechanical stirring. The temperature and vacuum and stirring conditions were varied according to the method described in example 1.

The final product is a clear polymer, with a Mn of 13'100 g/mol and a Mw of 32'990 g/mol, measured on a Waters GPC system, using a 31'000 g/mol Mw BPA-homopolycarbonate standard in methylene chloride eluent.

The glass transition temperature of the final product is 170.16° C. (onset temperature on second heating at 10° C./min measured on a Perkin Elmer DSC).

The product has 920 ppm terminal phenolic OH groups (measured with IR spectroscopy, calibrated with a standard with 180 ppm of terminal phenolic OH groups and measured with a titration method).

Inventive Example 8

78.80 g of diphenyl carbonate, 55.90 g of bisphenol-A, 32.62 g of bisphenol-TMC and 40 g of phenol were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a clear polymer, with a Mn of 12'670 g/mol and a Mw of 31'810 g/mol, measured on a Waters GPC system, using a 31'000 g/mol Mw BPA-homopolycarbonate standard in methylene chloride eluent.

The glass transition temperature of the final product is 175.17° C. (onset temperature on second heating at 10° C./min measured on a Perkin Elmer DSC).

The product has 550 ppm terminal phenolic OH groups (measured with IR spectroscopy, calibrated with a standard with 180 ppm of terminal phenolic OH groups and measured with a titration method).

Inventive Example 9

78.80 g of diphenyl carbonate, 108.67 g of bisphenol-TMC and 40 g of phenol were molten in an alkali-free glass flask together with 121 µl tetraphenylphosphonium phenolate solution (5 wt.-% TPPP, 5 wt.-% demineralized water and 90 wt.-% phenol), and subjected to a batch transesterification under mechanical stirring. The temperature and vacuum and stirring conditions were varied according to the method described in example 1.

The final product is a clear polymer with a Mn of 7'930 g/mol and a Mw of 18'270 g/mol, measured on a Waters GPC system, using a 31'000 g/mol Mw BPA-homopolycarbonate standard in methylene chloride eluent.

The glass transition temperature was 226.97° C. (onset temperature on second heating at 10° C./min measured on a Perkin Elmer DSC).

The product has 880 ppm terminal phenolic OH groups (measured with IR spectroscopy, calibrated with a standard with 180 ppm of terminal phenolic OH groups and measured with a titration method).

Plotting these results in tables, shows the following for molecular weight build-up (Mw in g/mol):

TABLE 2

| $M_w$ (g/mol) | Mol % bisphenol TMC, based on total amount of bisphenols | | |
|---|---|---|---|
| | 20 | 30 | 100 |
| 0 wt. % phenol[1] | 34230 | 28540 | 18820 |
| 10-11 wt. % phenol[1] | 30870 | 29730 | 28005 |
| 18-20 wt. % phenol[1] | 32990 | 31810 | 18270 |

[1] A small amount of phenol is always present due to the addition of the catalyst in a phenol-containing solution. Said amount is the same for all examples (inventive/comparative) and is not shown.

This shows that using 10.8 wt % of phenol allows a slower, "normal" molecular weight build-up, independent of the amount of bisphenol TMC used. With no phenol addition, Mw drops significantly at increasing bisphenol TMC content, due to early blockage of the agitator (processing problems leading to inhomogeneous reaction). With addition of high amounts of phenol (>17.5 wt.-%), the reaction starts too slowly for the standard temperature profile, leading to uncontrolled reactions. The optimal phenol addition in the present invention is found to be between 7 and 15 wt % in the total raw material feed used.

TABLE 3 shows the summarized result with regard to the terminal OH group content (in ppm):

| terminal phenolic OH groups | Mol % bisphenol TMC, based on total amount of bisphenols | | |
|---|---|---|---|
| (ppm) | 20 | 30 | 100 |
| 0 wt. % phenol[1] | 500 | 500 | 550 |
| 10-11 wt. % phenol[1] | 500 | 510 | 550 |
| 18-20 wt. % phenol[1] | 920 | 550 | 880 |

[1] A small amount of phenol is always present due to the addition of the catalyst in a phenol-containing solution. Said amount is the same for all examples (inventive/comparative) and is not shown.

It becomes evident again that at large amounts of phenol (>17.5 wt.-%) added, the reaction is only started at a too high temperature and too low pressure, leading to loss of phenol and increased content of OH terminated polymers. 0 to 15 wt % of phenol addition is the preferred range with regards to terminal OH group formation.

TABLE 4

| Glass transition temperature (in ° C.): | shows the glass transition temperatures of the products (in ° C.): Mol % bisphenol TMC, based on total amount of bisphenols | | |
|---|---|---|---|
| | 20 | 30 | 100 |
| 0 wt. % phenol[1] | 162.26 | 172.92 | — |
| 10-11 wt. % phenol[1] | 162.52 | 172.21 | 222.5 |
| 18-20 wt. % phenol[1] | 170.16 | 175.17 | 226.97 |

[1]A small amount of phenol is always present due to the addition of the catalyst in a phenol-containing solution. Said amount is the same for all examples (inventive/comparative) and is not shown.

For achieving the desired high glass transition temperature, the optimal amount of phenol added to the reaction mixture is found to be 5-25 wt %.

The working range for all relevant parameters combined is concluded to be the above mentioned 5-20 wt % of phenol to the total raw material feed, preferably 5-17.5 wt %, more preferably 7-15 wt %.

The invention claimed is:

1. A process for preparing (co)polycarbonates by the melt transesterification method, the process comprising reacting at least one diaryl carbonate with a dihydroxyaryl compound of formula (1),

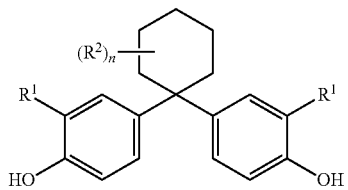

(1)

wherein
$R^1$ is H or $C_1$-$C_4$-alkyl
$R^2$ is $C_1$-$C_4$-Alkyl, and
n is 0, 1, 2 or 3;
wherein the process further comprises the addition of a monohydroxyaryl compound which corresponds to the monohydroxyaryl compound that is generated by the transesterification of the diaryl carbonate; and
wherein the monohydroxyaryl compound is added in an amount of 5.0 to 20.0 wt.-%, based on the total mass of the reaction mixture.

2. The process according to claim 1, wherein the diaryl carbonate is a compound of general formula (2)

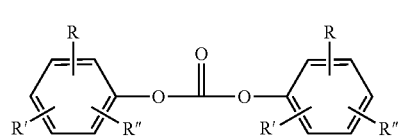

(2)

wherein R, R' and R", independently of one another, are identical or different and represent hydrogen, linear or branched $C_1$-$C_{34}$-alkyl, $C_7$-$C_{34}$-alkylaryl or $C_6$-$C_{34}$-aryl.

3. The process according to claim 1, wherein the diaryl carbonate is diphenyl carbonate.

4. The process according to claim 1, wherein the reaction mixture contains bisphenol A as a further dihydroxyaryl compound.

5. The process according to claim 1, wherein the monohydroxyaryl compound is recovered from the product mixture.

6. The process according to claim 5, wherein the recovered monohydroxyaryl compound is re-used in the process and/or used for producing diaryl carbonate.

7. The process according to claim 5, wherein the recovered monohydroxyaryl compound is used for producing bisphenols.

8. The process according to claim 1, wherein the diaryl carbonate is diphenyl carbonate and the monohydroxyaryl compound is phenol.

9. The process according to claim 1, wherein $R^1$ is H, $R^2$ is methyl and n is 3.

10. The process according to claim 1, wherein the diaryl compound is reacted with bisphenol A and bisphenol TMC.

11. The process according to claim 1, wherein the monohydroxyaryl compound is added in an amount of 5.0 to 17.5 wt.-%, based on the total mass of the reaction mixture.

12. The process according to claim 1, wherein the monohydroxyaryl compound is added in an amount of 7.0 to 15.0 wt.-%, based on the total mass of the reaction mixture.

13. The process according to claim 1, wherein the monohydroxyaryl compound is added before or at the beginning of the transesterification reaction.

14. A (co)polycarbonate obtained by the process according to claim 1.

15. The process of claim 1, wherein the diaryl carbonate is reacted with the dihydroxyaryl compound of formula (1) and one or more further dihydroxyaryl compounds.

* * * * *